US006733410B2

(12) United States Patent
Saito

(10) Patent No.: US 6,733,410 B2
(45) Date of Patent: May 11, 2004

(54) WEAR-ELONGATION RESISTANT SILENT CHAIN

(75) Inventor: Toyonaga Saito, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/045,715

(22) Filed: Oct. 26, 2001

(65) Prior Publication Data
US 2002/0061800 A1 May 23, 2002

(30) Foreign Application Priority Data
Oct. 26, 2000 (JP) ........................................ 2000-327863

(51) Int. Cl.⁷ ............................................... F16G 13/04
(52) U.S. Cl. ........................ 474/212; 474/201; 474/213
(58) Field of Search ................................. 474/212, 213, 474/201

(56) References Cited

U.S. PATENT DOCUMENTS

| 2,915,909 | A | | 12/1959 | Boron | |
| 4,227,425 | A | | 10/1980 | Bendall | |
| 4,469,221 | A | * | 9/1984 | Albert | 474/213 |
| 4,906,224 | A | * | 3/1990 | Reber | 474/213 |
| 5,360,378 | A | * | 11/1994 | Suzuki et al. | 474/161 |
| 5,464,374 | A | * | 11/1995 | Mott | 474/224 |
| 5,989,141 | A | | 11/1999 | Kozakura et al. | |
| 6,142,902 | A | * | 11/2000 | Ichikawa et al. | 474/212 |
| 6,186,920 | B1 | * | 2/2001 | Reber | 474/212 |
| 6,393,820 | B1 | * | 5/2002 | Varnam et al. | 474/212 |
| 6,485,385 | B2 | * | 11/2002 | Shimaya | 474/213 |

FOREIGN PATENT DOCUMENTS

| EP | 0 937 910 A1 | 8/1999 |
| JP | 09196126 A | 7/1997 |
| JP | 09-250600 | 9/1997 |
| JP | 2000-205346 | 7/2000 |

* cited by examiner

Primary Examiner—William C. Joyce
Assistant Examiner—Bradley J. Van Pelt
(74) Attorney, Agent, or Firm—Howson and Howson

(57) ABSTRACT

A wear-elongation resistant silent chain includes guide link rows and articular link rows articulately connected together in an alternate fashion along the length of the chain by connecting pins inserted through respective pin holes of guide plates, guide link plates and articular link plates, with guide plate retainers secured to respective both ends of the connecting pins so as to keep the guide plates in position against removal from the connecting plates. The guide link plate and the articular link plates have different thicknesses so dimensioned as to balance the tensile strength of the guide link plate in one guide link row and the tensile strength of the articular link plates in the adjacent articular link row connected together by one of the connecting pins, thereby suppressing bending of the connecting pin. By thus suppressing the bending of connecting pin, wear elongation of the chain is prevented from occurring during power transmitting operation of the chain.

11 Claims, 5 Drawing Sheets

FIG. 1A
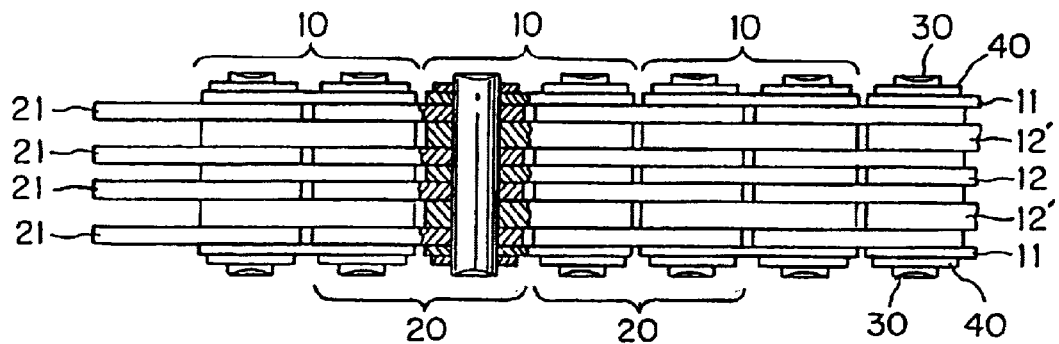
FIG. 1B
FIG. 2
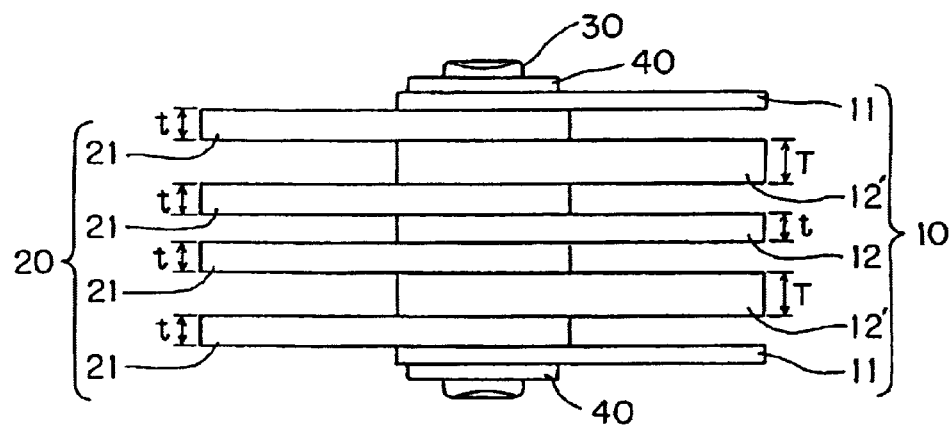

WEAR-ELONGATION RESISTANT SILENT CHAIN

BACKGROUND OF THE INVENTION

1. Field of the Invention

The present invention relates to a silent chain used as a power transmitting means such as a timing chain for an engine.

2. Description of the Related Art

A conventional silent chain known from Japanese Patent Laid-open Publication No. HEI 9-196126 includes, as shown here in FIG. 8, guide link rows A each having two guide plates A1 and three guide link plates A2 disposed the guide plates A1, articular link rows B each having four articular link plates B1 interleaved with the five plates A1, A2 in an adjacent guide link row B, and connecting pins C inserted through respective pin holes of the guide plates A1, guide link plates A2 and articular link plates B1 to articulately connect together the guide link rows and the articular link rows in an alternate fashion along the length of the chain, each of the connecting pins being press-fit at opposite ends with the pin holes of the laterally aligned guide plates A1.

For convenience of manufacture and control of parts of the silent chain, both the plates A1, A2 in guide link rows B and the plates B1 in articular link rows A are designed to have a uniform thickness.

From the structural point of view, the number of plates A1, A2 disposed in each guide link row A and the number of plates B1 disposed in each articular link row B necessarily differ from each other. This difference causes a problem that due to an unbalanced tensile strength in the longitudinal direction of the chain about each connecting pin, the link plates B1 in each articular link row B having fewer links than the guide link row A form a weak point in terms of the chain strength.

Furthermore, as shown in FIG. 9, since the opposite ends of the connecting pins C are fixed by press-fitting to the pin holes of the guide plates A1, a chain tension produced during power transmitting operation of the chain causes the connecting pins C to flex or bend as indicated by the arrowheads. Especially, two outer ones of the articular link plates B1 located adjacent to the guide plates A1 suffers from uneven contact with the connecting pin C due to concentration of a tensile load, producing an excessively large surface pressure acting on the circumferential surfaces of the pin holes of these outer articular link plates B1. This may cause undue wear of the pin hole circumferential surfaces, resulting in the occurrence of a wear elongation of the chain. As the wear elongation increases, the two outer articular link plates B1 are most likely to become ruptured. This may cause rupture of the silent chain as a whole.

The press-fit connection between the connecting pin C and the guide plates A1 in each guide link row A prevents rotation of the connecting pin C relative to the plates A1, A2 of the guide link row A and allows rotation of the connecting pin C relative to the link plates B1 of the adjacent articular link row B. This arrangement leads to formation of circumferential grooves on the outer surface of the connecting pin caused due to abrasion with the articular link plates B1. The connecting pin C is susceptible to breakage at the grooved portions during a relatively short period of use, which may cause rupture of the silent chain.

SUMMARY OF THE INVENTION

With the foregoing problems in view, an object of the present invention is to provide a wear-elongation resistant silent chain which can prevent wear elongation of the chain from occurring during power transmitting operation of the chain and also prevent rupture of the link plates in articular link rows and breakage of the connecting pins.

To achieve the foregoing object, according to the present invention, there is provided a wear-elongation resistant silent chain comprising: guide link rows each having a pair of guide plates and at least one guide link plate disposed between the guide plates; articular link rows each having at least two articular link plates interlaced with the guide link plate of the adjacent guide link row, the number of the articular link plates in each articular link row being one more than the number of the guide link in each guide link row; connecting pins inserted through respective pin holes of the guide plates, guide link plate and articular link plates so as to articulately join the guide link rows and the articular link rows in an alternate fashion along the length of the silent chain; and guide plate retainers each secured to one of opposite ends of each of the connecting pins to keep the guide plates in position against removal from the connecting pins. The guide link plate and the articular link plates have different thicknesses so dimensioned as to balance the tensile strength of the guide link plate in one of the guide link row and the tensile strength of the articular link plates in the adjacent articular link row that are connected by one of the connecting pins.

The guide plates may take any configurations provided that they have a pin hole loosely receptive of the connecting pin. For example, a guide plate having a pair of pin holes larger in diameter than pin holes formed in guide and articular link plates, a guide plate having an opening formed between two pin holes so as to reduce the weight of the guide plate, or a guide plate having a single oblong aperture corresponding in length to the outside distance between a pair of pin holes of a similar guide plate can be used.

The guide plate retainers may take any forms provided that they can prevent removal of the guide plates from the connecting pin while permitting articulate movement of the guide plates, guide link plates and articular link plates relative to the connector pin. Examples of the guide plates include a press-fit washer adapted to be press-fit on the connecting pin, a split cotter pin adapted to be inserted in a hole to hold the guide plate to the connecting pin, and a stopper plate adapted to be attached by caulking to the connecting pin. From the viewpoint of downsizing, weight-reduction, structural simplification, manufacturing cost and maintenance, the press-fit washer is preferable.

The number of the guide link plates is preferably three or greater because this arrangement can increase the degree of design freedom to such an extent that a tendency for bending of the connecting pins to occur is prohibited with increased efficiency by differentiating the thickness of the guide link plates and the thickness of the articular link plates.

In the wear-elongation resistant silent chain of the present invention, since the guide link rows and the articular link rows are articulately connected together in an alternate fashion by means of the connecting pins inserted through respective pin holes in the guide plates, guide link plates and articular link plates, a chain tension acting around each individual connecting pin during power transmitting operation of the silent chain is borne by the guide link plate of one guide link row and the articular link plates of the adjacent articular link row without exerting any influence on the guide plates that are mounted by sliding fit on the connecting pin. At the same time, the guide plates, guide link plate and articular link plates contact uniformly with the circumferential surface of the connecting pin.

The guide plate retainers secured to the opposite ends of each connecting pin keep the guide plates in position against removal from the connecting pin without restraining mutual movement of the adjacent connecting pins. The guide plates are, therefore, freed from the tensile load applied during power transmitting operation of the silent chain.

In the wear-elongation resistant silent chain of the present invention, since bending of the connecting pins is suppressed by differentiating the thickness of the guide link plates and the thickness of the articular link plates, the tensile strength of the guide link plate in one guide link row can balance the tensile strength of the articular link plates in the adjacent articular link row regardless of the difference in number of the link plates. Thus, the guide link plate and each of the articular link plates can engage the connecting pin uniformly at a constant surface pressure. This ensures that chordal oscillation of the chain, which may occur due to wear elongation of the chain, is prevented from occurring over a long period of time, and stable power transmitting operation of the silent chain can be maintained.

BRIEF DESCRIPTION OF THE DRAWINGS

Preferred embodiments of the present invention will now be described in detail, by way of example only, with reference to the accompanying drawings, in which:

FIG. 1A is a plan view, with parts in cross section, of a wear-elongation resistant silent chain according to a first embodiment of the present invention;

FIG. 1B is a side view, with parts broken away for clarity, of the wear-elongation resistant silent chain;

FIG. 2 is a plan view on enlarged scale of a portion of the wear-elongation resistant silent chain according to the first embodiment shown in FIG. 1, the view showing the mutual relationship between the thickness of plates in a guide link row and the thickness of plates in an articular link row;

DETAILED DESCRIPTION OF THE PREFERRED EMBODIMENTS

Figure 3:
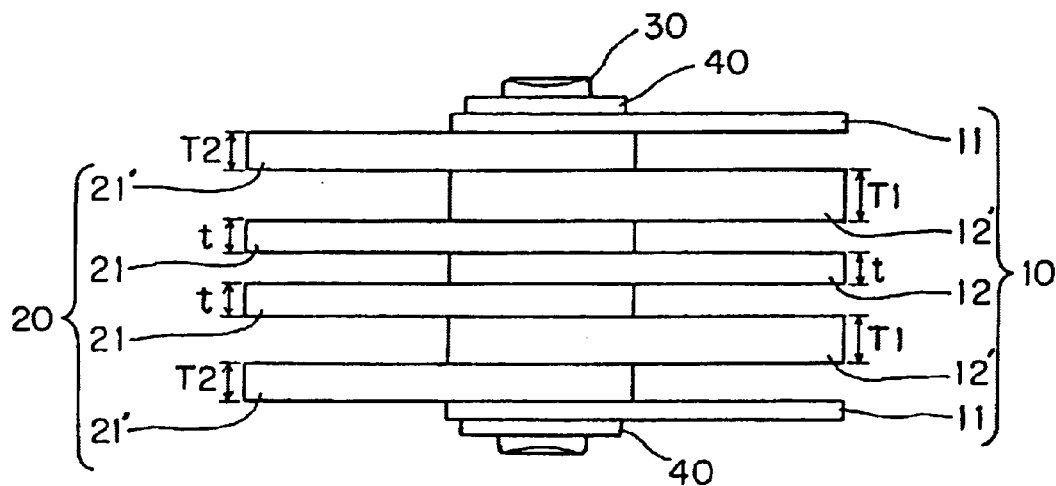
FIG. 3 is a view similar to FIG. 2, but showing the mutual relationship between the thickness of plates in each guide link row and the thickness of plates in each articular link row according to a second embodiment of the present invention.

The following description is merely exemplary in nature and is in no way intended to limit the invention or its application or uses.

FIGS. 1A and 1B show a wear-elongation resistant silent chain according to a first embodiment of the present invention. The silent chain includes guide link rows 10 each having two guide plates 11, 11 and three guide link plates 12', 12, 12' disposed between the guide plates 11, and articular link rows 20 each having four articular link plates 21 interleaved with the guide link plates 12, 12' in the adjacent guide link row 10. The guide link rows 10 and the articular link rows 20 are articulately connected together by connecting pins 30 in an alternate fashion along the length of the silent chain. A pair of guide plate retainers 40 is secured to opposite ends of each connecting pin 30 so as to keep the guide plates 11 in position against removal from the connecting pin 30, without restraining mutual movement of the adjacent connecting pins 30. The connecting pins 30 in the illustrated embodiment are round pins. The guide plates 11, guide link plates 12, 12' and articular link plates 21 each have a pair of pin holes slidably receiving therein one of the connecting pins 30. Thus, the connector pin 30 and the plates 11, 12, 12' and 21 mounted thereon are in sliding fit with each other. The guide link plates 12 and articular link plates 21 have a pair of generally V-shaped link teeth (not designated) adapted to mesh with teeth of a sprocket for power transmitting operation.

As shown in FIG. 2, the guide link plates 12, 12' of each guide link row 10 and the articular link plates 21 of each articular link row 20 have different thicknesses for the purpose of suppressing bending of the connecting pin 30 during power transmitting operation. In the illustrated embodiment, two outer ones 12' of the guide link plates in each guide link row 10 have a thickness T, and the remaining guide link plate 12 has a thickness t smaller than the thickness of the outer guide link plates 12'. The four articular link places 21 in each articular link row 20 have the same thickness t which is equal to the thickness t of the guide link plate 12 disposed between the outer guide link plates 12' of larger thickness.

With the silent chain thus constructed, since the guide plates 11 are slidably mounted on the connecting pins 30 without restraining mutual movement of the adjacent connecting pins 30, the guide plates 11 are freed from tensile load applied when the silent chain is in the power transmitting operation. The link plates of the guide link row 10, which are formed by two outer guide link plates 12' having the larger thickness T and the intermediate guide link plate 12 of the smaller thickness t, balance in strength with the link plates of the articular link row 20 which are formed by four articular link plates 21 of the thickness t. Since the outer guide link plates 12' located adjacent to the guide plates 11 are made thicker than the articular link plate 21 (T>t), even though the number of the guide link plates 12, 12' is one less than the number of the articular link plates 21, the chain tension acting during the power transmitting operation on that portions (sliding-contact portions relative to the link plates 12', 21) of the connecting pin 30 located adjacent the guide plates 12 is well balanced with the chain tension acting on the remaining part of the connecting pin 30. The connecting pin 30 is thus prevented from becoming bent during power transmitting operation.

By virtue of the balanced strength of the link plates 12, 12', 21 and the balanced chain tension on the connecting pin 30, wear-elongation of the chain during power transmitting operation does not occur as in the conventional silent chain, and rupture of the link plates 12, 12', 21 and break of the connecting pin 30 can be prevented. Furthermore, chordal oscillation of the chain, which may occur due to wear elongation of the chain, is prevented from occurring over a long period of time, so that stable power transmitting operation of the silent chain can be maintained.

FIG. 3 shows a part of a wear-elongation resistant silent chain according to a second embodiment of the present invention. The silent chain in this embodiment differs from the silent chain of the first embodiment only in the manner of combination of link plates of different thicknesses. Accordingly, description of the fundamental chain structure can be omitted.

In the embodiment shown in FIG. 3, guide link plates 12, 12' of each guide link row 10 and articular link plates 21, 21' in each articular link row 20 are designed to have different thicknesses so as to suppress bending of a connecting pin 30 articulately interconnecting the guide and articular link rows 10, 20. Stated more specifically, the guide link row 10 has two guide plates 11 and three guide link plates 12, 12' disposed between the guide plates 11. Two outer ones 12' of the guide link plates located adjacent to the guide plates 11 have a thickness T1, and an intermediate one 12 of the guide link plates has a thickness t which is smaller than that T1 of the outer guide link plates 12'. The articular link row 20 has four articular link plates 21, 21' interleaved with the guide link plates 12, 12'. Two outer ones 21', 21' of the articular link plates located adjacent to the guide plates 11 have a thickness T2, and intermediate two articular link plates 21 have a thickness t which is smaller than that T2 of the outer articular link plates 21'. The thickness T2 of the outer articular link plates 21' is smaller than that T1 of the guide link plates 12'.

In this arrangement, three guide link plates 12, 12' in the guide link row 10 and the four articular link plates 21, 21' in the articular link row 20 maintain the overall strength balance of the chain regardless of the presence of the guide plates 11. By the use of the outer guide link plates 12' which are made thicker than the outer articular link plates 21' (T1>T2), it is possible to maintain the balance of chain tension during power transmitting operation even on that portions (sliding-contact portions relative to the link plates 12', 21') of the connecting pin 30 located adjacent to the guide plates 11 notwithstanding the fact that the guide link row 10 has fewer link plates than the articular link row 20. Bending of the connecting pin 30 during power transmitting operation can thus be prevented from occurring.

Figure 4:
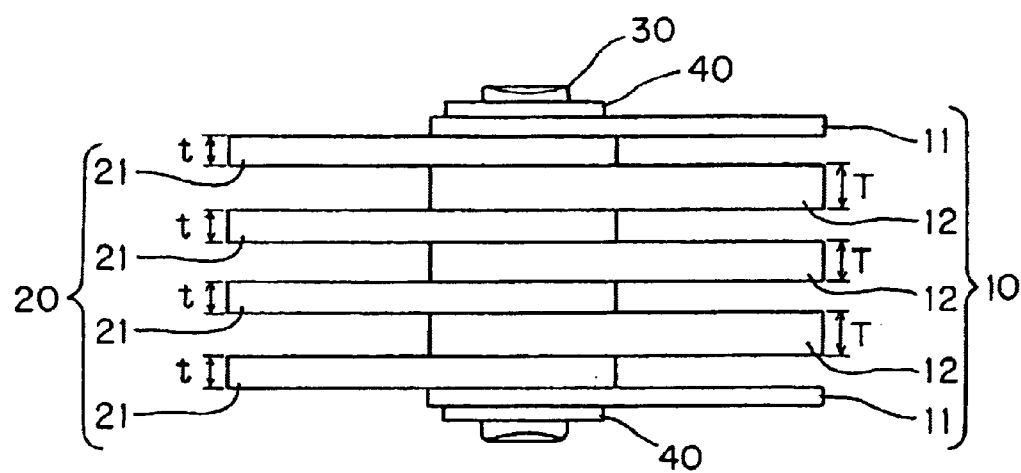
FIG. 4 is a view similar to FIG. 2, but showing the mutual relationship between the thickness of plates in each guide link row and the thickness of plates in each articular link row according to a third embodiment of the present invention.

FIG. 4 shows a part of a wear-elongation resistant silent chain according to a third embodiment of the present invention. The silent chain in this embodiment differs from the silent chains of the first and second embodiments only in the manner of combination of link plates of different thicknesses. Accordingly, no description is needed for the fundamental chain structure.

In the embodiment shown in FIG. 4, guide link plates 12, 12' of each guide link row 10 and articular link plates 21 in each articular link row 20 are designed to have different thicknesses so as to suppress bending of a connecting pin 30 articulately interconnecting the guide and articular link rows 10, 20. Stated more specifically, the guide link row 10 has two guide plates 11 and three guide link plates 12 of the same thickness T disposed between the guide plates 11. The articular link row 20 has four articular link plates 21 of the same thickness t interleaved with the guide link plates 12, 12'. The thickness T of the guide link plates 12 is larger than the thickness t of the articular link plates 21.

With this arrangement, the overall strength balance of the chain is maintained by three guide link plates 12 in the guide link row 10 and the four articular link plates 21 of the articular link row 20, regardless of the presence of the guide plates 11. Since two outer ones of the guide link plates 12 located adjacent to the guide plates 11 are made thicker than the articular link plates 21 (T>t), the balance of chain tension during power transmitting operation can be attained even on those portions (sliding-contact portions relative to the link plates 12, 21) of the connecting pin 30 located adjacent to the guide plates 11 notwithstanding the fact that the number of the link plates 21 of the guide link row 10 is one less than that of the link plates 21 of the articular link row 20. The well-balanced chain tension can effectively preclude the occurrence of bending of the connecting pin 30 during power transmitting operation of the chain.

Figure 5:
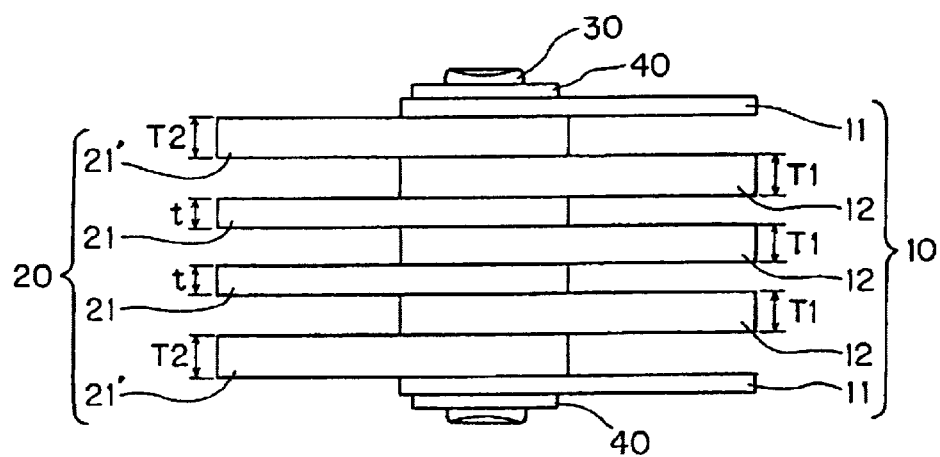
FIG. 5 is a view similar to FIG. 2, but showing the mutual relationship between the thickness of plates in each guide link row and the thickness of plates in each articular link row according to a fourth embodiment of the present invention.

FIG. 5 shows a part of a wear-elongation resistant silent chain according to a fourth embodiment of the present invention. The silent chain in this embodiment differs from the silent chains of the first, second and third embodiments only in the manner of combination of link plates of different thicknesses. Accordingly, description of the fundamental chain structure can be omitted.

In the embodiment shown in FIG. 5, guide link plates 12 of each guide link row 10 and articular link plates 21, 21' in each articular link row 20 are designed to have different thicknesses so as to suppress bending of a connecting pin 30 articulately interconnecting the guide and articular link rows 10, 20. Stated more specifically, the guide link row 10 has two guide plates 11 and three guide link plates 12 of the same thickness T1 disposed between the guide plates 11. The articular link row 20 has four articular link plates 21, 21' interleaved with the guide link plates 12. Two outer ones 21' of the articular link plates located adjacent to the guide plates 11 have a thickness T2, and the remaining articular link plates 21 disposed between the outer articular link plates 21' have a thickness t smaller than the thickness T2 of the outer link plates 21'. The thickness T1 of the guide link plates 12 is substantially equal to the thickness T2 of the outer articular link plates 21'.

With this arrangement, the overall strength balance of the chain is maintained by three guide link plates 12 of the guide link row 10 and four articular link plates 21, 21' of the articular link row 20 regardless of the presence of the guide plates 11, 11. Partly because two outer ones 12 of the guide link plates located adjacent to the guide plates 11 are made substantially equal in thickness to the outer articular link plates 21' (T1 T2), and because the intermediate articular link plates 21 located adjacent to a longitudinal central portion of the connecting pin 30 are made smaller in thickness of the guide link plates 12 (t<T1), the chain tension applied during power transmitting operation to that portions (sliding-contact portions relative to the link plates 12, 21') of the connecting pin 30 located adjacent to the guide link plates 11 is balanced with the chain tension acing on the remaining part of the connecting pin 30 even though the number of the link plates 12 in the guide link row 10 is one less than that of the link plates 21, 21' of the articular link row 20. The connecting pin 30 is thus prevented from becoming bent during power transmitting operation of the chain.

Figure 6:
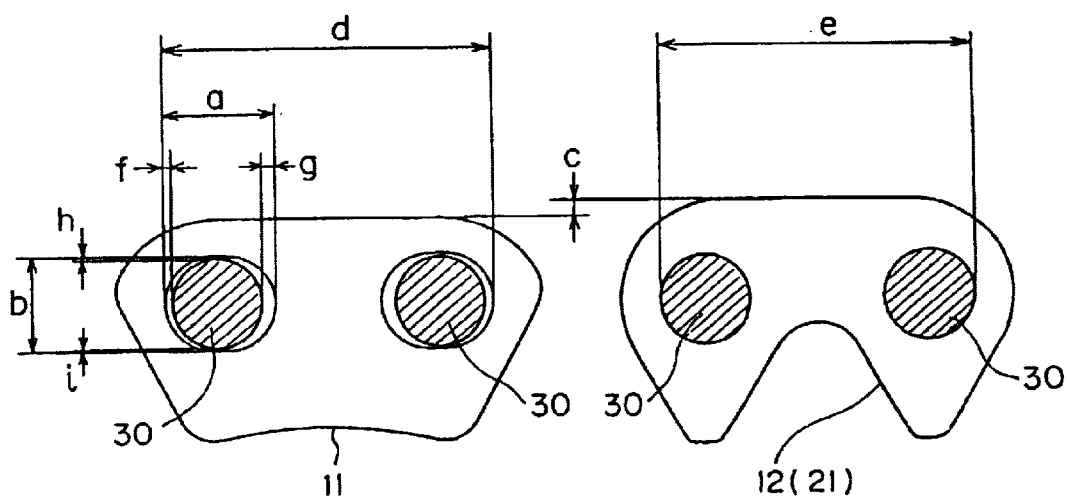
FIG. 6 is a view showing dimensional features of pin holes of a guide plates of the wear-elongation resistant silent chain taken in conjunction with dimensions of a link plate.

FIG. 6 shows various dimensions of the guide plate 11 and link plate 12 (21) to be considered when pin holes are formed in the guide plate 11, the dimensions being indicated by alphabetical letters.

The pin hole of the guide plates can take any configurations provided that it is slidably receptive of the connecting pin 30. In order to enhance the effect of the present invention, it is preferable that the pin hole satisfies the dimensional conditions, as enumerated below.

(1) a>b≧diameter of the connecting pin 30, where "a" is the diameter of the pin hole as measured in the longitudinal direction of the guide plate 11 which is parallel to the direction of travel of the chain, and "b" is the diameter of the pin hole in the transverse direction of the guide plate 11. By setting "a" to be larger than the connecting pin diameter, the pin hole serves also as a passageway for lubricating oil. Furthermore, setting "b" greater than or equal to the connecting pin diameter and smaller than "a" ensures that movement of the guide plate 11 in the transverse direction (top-and-bottom direction in FIG. 6) is limited, thereby preventing interference between the guide plate 11 and a chain guide lever (not shown) when the chain starts to travel.

(3) c≧h+i, where "c" is the difference in height between the guide the plate 11 and the link plate 12 (21) measured with reference to the axis of the connecting pin 30, and "h" and "i" are clearances defined on opposite sides of the connecting pin 30 in the transverse direction of the guide plate 11. Setting "c" greater than or equal to "h+i" achieves the same effect as the condition set forth in the preceding paragraph (1).

(4) 0<d−e<500 µm, where "d" and "e" are as specified above. This dimensional condition ensures that rotation of the connecting pin 30 is not constrained by the guide plate 11, and the guide plate 11 is protected from becoming distorted by the connecting pin 30.

(5) 0<f+g<200 µm, where "f" and "g" are clearances defined on opposite sides of the connecting pin 30 in the longitudinal direction of the guide plate 11. This dimensional condition is effective to achieve the same effect as attained by the condition set forth in the preceding paragraph (4).

Figure 7A:
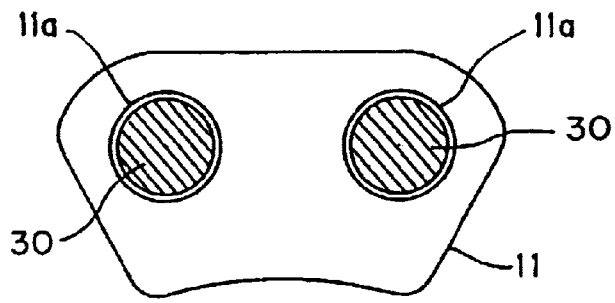
FIGS. 7A to 7E are views showing variants of a guide plate retainer of the wear-elongation resistant silent chain.
Figure 7B:
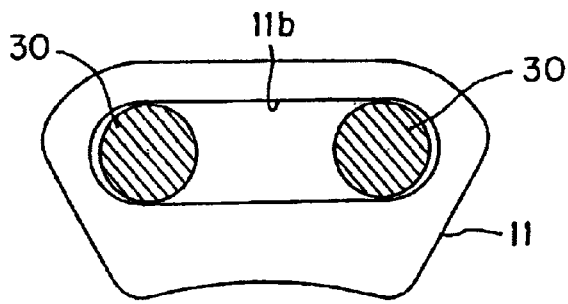
Figure 7C:
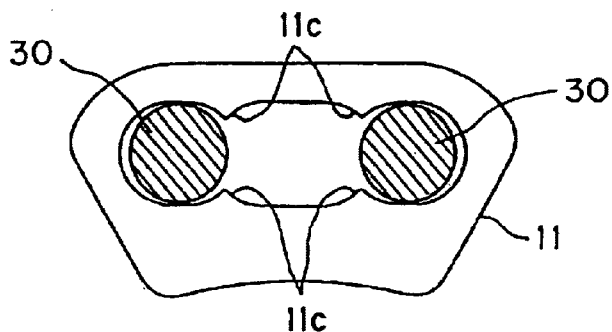
Figure 7D:
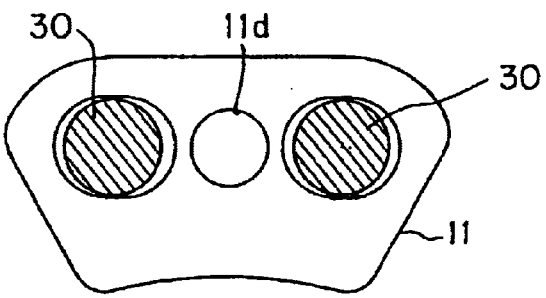
Figure 7E:
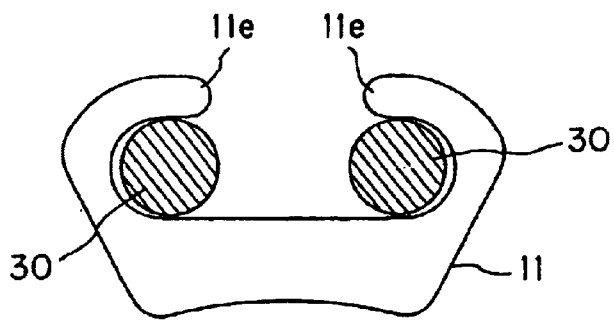
Figure 8A:
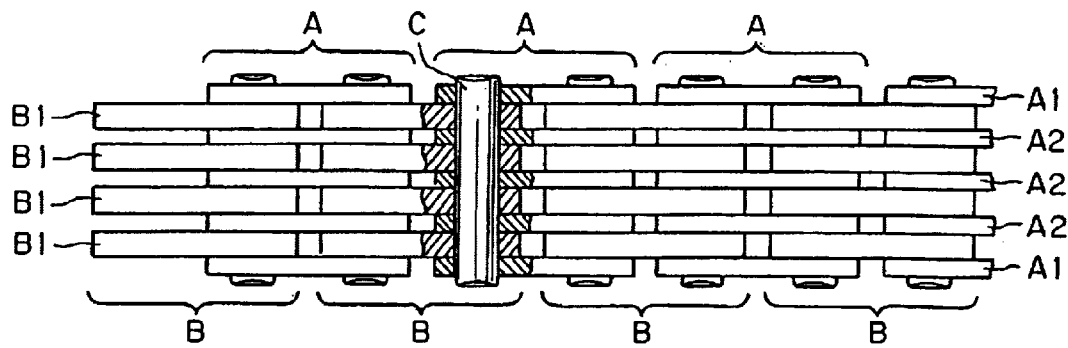
FIG. 8A is a plan view, with parts in cross section, of a conventional silent chain.
Figure 8B:
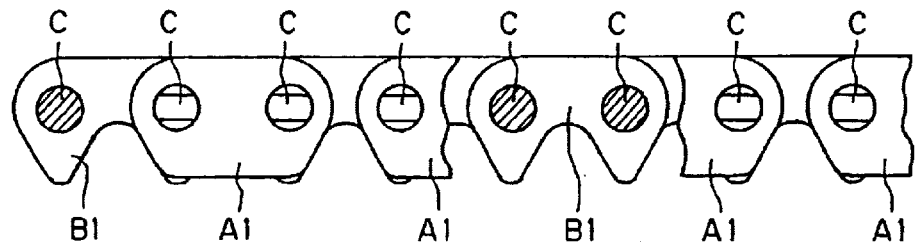
FIG. 8B is a side view, with parts broken away for clarity, of the conventional silent chain.
Figure 9:
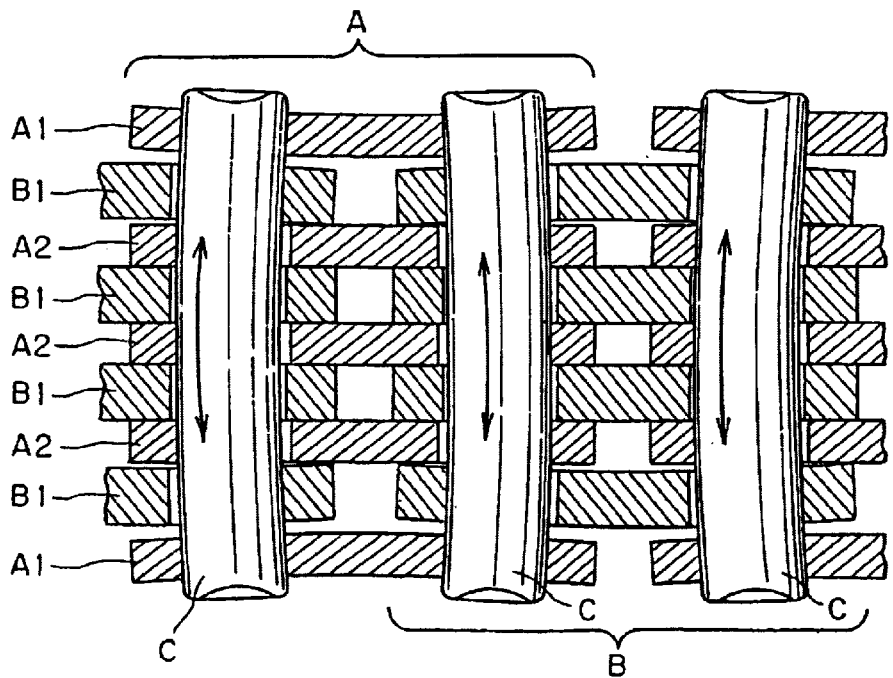
FIG. 9 is a cross-sectional view showing a part of the conventional silent chain while in power transmitting operation.

FIGS. 7A to 7E show variants of the guide plate that can be used in the wear-elongation resistant silent chain according to the present invention. The guide plate 11 shown in FIG. 7A has a pair of pin holes 11a having a diameter one size larger than the diameter of the connecting pins 30. FIG. 7B shows a guide plate 11 having an oblong pin hole 11b formed therein for the purpose of reducing the weight of the guide plate 11. The oblong hole 11b has a diameter along the major axis which is substantially equal to the outside distance between the pin holes 11a of the guide plate 11 shown in FIG. 7A. FIG. 7C shows a modified form of the guide plate 11 shown in FIG. 7B. The modified guide plate 11 has stopper projections or ribs 11c formed at appropriate position on the periphery of the oblong pin hole so as to preclude accidental movement of the connecting pins 30 in the longitudinal direction of the guide plate 11. The guide plate 11 shown in FIG. 7D differs from the guide plate shown in FIG. 7A in that the pin holes have an oblong shape and an aperture 11e is formed between the pin holes to reduce the weight of the guide plate 11. FIG. 7E shows a modified form of the guide plate 11 shown in FIG. 7B. The modified guide plate 11 has a pin hole having an open shape in cross-section. In order to prevent the guide plate 11 from becoming displace off the connecting pin 30, the guide plate 11 has a pair of fingers 11e, 11e, curved to hold the guide plate 11 on the connecting pins 30.

As described above, the wear-elongation resistant silent chain according to the present invention includes guide link rows and articular link rows articulately connected together in an alternate fashion along the length of the chain by means of connecting pins inserted through respective pin holes of guide plates, guide link plates and articular link plates. Since the pin holes of the guide plates are in sliding fit with the connecting pins, the tensile strength of the chain in the longitudinal direction thereof is determined by the guide link plates in each guide link row and the articular link plates in the adjacent articular link row connected together by one of the connecting pins, regardless of the presence of the guide plates. Thus, the guide plates have an increased degree of design freedom. During power transmitting operation of the silent chain, the guide plates, guide link plates and articular link plates contact the circumferential surfaces of the connecting pins uniformly, so that breakage of connecting pins, which may occur in the conventional silent chains due to undue wear of the connecting pins, can be avoided.

The guide plate retainers secured to opposite ends of each of the connecting pins keep the guide plates in position against removal from the connecting pin, without restraining movement of the adjacent connecting pins. The guide plates are freed from a duty or function to support a tensile load during power transmitting operation. The guide link plates disposed between the guide plates are no longer constrained by the guide plates and, accordingly, rupture of the guide link plates does not occur even after prolonged use of the silent chain.

The guide link plates and the articular link plates have different thickness, so dimensioned as to suppress bending of the connecting pins during power transmitting operation of the silent chain. In spite of the guide link rows having fewer link plates than the articular link rows, each individual link plate in the guide and articular link rows can engage the connecting pins uniformly with a substantially uniform surface pressure acting therebetween, thereby suppressing wear-elongation of the silent chain during power transmitting operation. By thus suppressing the wear-elongation of chain, the silent chain can perform power transmitting operation in a stable and accurate manner over a long period of use without causing chordal oscillation, jumping of the chain from the sprocket teeth, or mis-meshing of the chain with the sprocket teeth.

Obviously, various minor changes and modifications of the present invention are possible in the light of the above teaching. It is therefore to be understood that within the scope of the appended claims, the present invention may be practiced otherwise than as specifically described.

What is claimed is:

1. A wear-elongation resistant silent chain comprising:
    guide link rows each having a pair of guide plates and at least one guide link plate disposed between the guide plates;
    articular link rows each having at least two articular link plates interlaced with the guide link plate of the adjacent guide link row, the number of the articular link plates in each articular link row being one more than the number of the guide link in each guide link row;
    connecting pins inserted through respective pin holes of the guide plates, guide link plate and articular link plates so as to articulately join the guide link rows and the articular link rows in an alternate fashion along the length of the silent chain; and
    guide plate retainers each secured to one of opposite ends of each of the connecting pins to keep the guide plates in position against removal from the connecting pins;
    wherein the guide link plate and the articular link plates have different thicknesses so dimensioned as to balance the tensile strength of the guide link plate in one of the guide link row and the tensile strength of the articular link plates in the adjacent articular link row that are connected by one of the connecting pins;
    wherein each said guide plate has a pair of pin holes, each receiving a connecting pin, and each pin hole of said pair has a peripheral surface engageable by the pin therein to limit movement of said guide plate in both directions along the longitudinal direction of the guide plate, said longitudinal direction of the guide plate being parallel to the direction of travel of the chain;

wherein the length (a) of each said pin hole in each guide plate, measured in said longitudinal direction of said guide plate, exceeds the transverse width (b) of said pin hole, measured in a direction perpendicular to said longitudinal direction of the guide plate, whereby each said pin hole is elongated in said longitudinal direction, and wherein said width (b) of said pin hole is greater than or equal to the diameter of the connecting pin inserted through said pin hole, whereby said pin hole can serve as a passageway for lubricating oil while engagement of the pin hole with the pin limits movement of the guide plate in the direction of the transverse width of said pin hole;

wherein the outside distance (d) between the two pin holes in each guide plate is greater than the outside distance (e) between the connecting pins received therein by an amount between 0 and 500 μm; and wherein the height of the guide links in each guide link row exceeds the height of the guide elates therein by difference (c), measured with reference to a connecting pin axis, said difference (c) being greater than or equal to the sum of the clearances (h) and (i) between each connecting in and the guide plate on opposite sides of the connecting pin, said clearances being measured in a direction perpendicular to the longitudinal direction of the guide plate.

2. The wear-elongation resistant silent chain according to claim 1, wherein the guide link plate has a thickness larger than the thickness of the articular link plates.

3. The wear-elongation resistant silent chain according to claim 1, wherein the number of the guide link plates is three or greater, two outer ones of the guide link plates located adjacent to the guide plates have a first thickness, the rest of the guide link plates having a second thickness smaller than the first thickness, and the articular link plates have a third thickness equal to the second thickness.

4. The wear-elongation resistant silent chain according to claim 1, wherein the number of the guide link plates is three or greater, two outer ones of the guide link plates located adjacent to the guide plates have a first thickness, the rest of the guide link plates have a second thickness smaller than the first thickness, two outer ones of the articular link plates located adjacent to the guide plates have a third thickness smaller than the first thickness and larger than the second thickness, and the rest of the articular link plates have a fourth thickness equal to the second thickness.

5. The wear-elongation resistant silent chain according to claim 1, wherein the number of the guide link plates is three or greater, the guide link plates have a first thickness, and the articular link plates have a second thickness smaller than the first thickness.

6. The wear-elongation resistant silent chain according to claim 1, wherein the number of the guide link plate is three or greater, the guide link plates have a first thickness, two outer ones of the articular link plates located adjacent to the guide plates have a second thickness substantially equal to the first thickness, and the rest of the articular link plates have a third thickness smaller than the first and second thicknesses.

7. The wear-elongation resistant silent chain according to claim 1, wherein the guide plates are in sliding contact with the connecting pins.

8. The wear-elongation resistant silent chain according to claim 1, wherein the pin holes in each guide plate are defined by stopper projections provided in a single opening elongated in said longitudinal direction of the guide plate and having a periphery, said stopper projections being formed on the periphery of the elongated opening to limit the motion of the connecting pins in the direction of a major axis of said elongated opening.

9. The wear-elongation resistant silent chain according to claim 1, wherein the guide plates each have a pair of pin holes and an aperture formed between the pin holes so as to reduce the weight of the guide plate.

10. The wear-elongation resistant silent chain according to claim 1, wherein the guide plates each have a pinhole having an open shape in cross-section, and a pair of fingers curved to hold the guide plate on the connecting pins.

11. The wear-elongation resistant silent chain according to claim 1, wherein the sum of the clearances (f) and (g), between each connecting pin and the guide plate on opposite sides of the connecting pin, measured in the longitudinal direction of the guide plate, is between 0 and 200 μm.

* * * * *

UNITED STATES PATENT AND TRADEMARK OFFICE
CERTIFICATE OF CORRECTION

PATENT NO. : 6,733,410 B2
DATED : May 11, 2004
INVENTOR(S) : Toyonaga Saito

It is certified that error appears in the above-identified patent and that said Letters Patent is hereby corrected as shown below:

Column 7,
After line 13, insert the following paragrtaph:

-- (2) $d \geq h+i$, where "d" us the outside distance between two pin holes in the guide plate 11, and "e" is the outside distance between the connecting pins 30 inserted in one link plate 12 (21). By setting "d" to be greater than or equal to "e", the connecting pins 30 are permitted to turn relative to the plates 11, 12, 21 during power transmitting operation --.

Column 10,
Line 27, after "periphery" insert -- and the guide plates further have -- before the word "said".

Signed and Sealed this

Twenty-first Day of September, 2004

JON W. DUDAS
*Director of the United States Patent and Trademark Office*